(12) United States Patent
Gorintin et al.

(10) Patent No.: US 9,222,959 B2
(45) Date of Patent: Dec. 29, 2015

(54) METHOD FOR THE COLLECTIVE FABRICATION OF CARBON NANOFIBERS ON THE SURFACE OF MICROPATTERNS CONSTRUCTED ON THE SURFACE OF A SUBSTRATE

(75) Inventors: Louis Gorintin, Lyons (FR); Jean Dijon, Champagnier (FR); Hélène Le Poche, Grenoble (FR); Denis Mariolle, Grenoble (FR)

(73) Assignee: Commissariat A L'Engergie Atomique, Paris (FR)

( * ) Notice: Subject to any disclaimer, the term of this patent is extended or adjusted under 35 U.S.C. 154(b) by 688 days.

(21) Appl. No.: 12/747,966

(22) PCT Filed: Dec. 9, 2008

(86) PCT No.: PCT/EP2008/067145
§ 371 (c)(1),
(2), (4) Date: Jun. 14, 2010

(87) PCT Pub. No.: WO2009/077388
PCT Pub. Date: Jun. 25, 2009

(65) Prior Publication Data
US 2010/0258525 A1    Oct. 14, 2010

(30) Foreign Application Priority Data

Dec. 14, 2007  (FR) ..................................... 07 08739

(51) Int. Cl.
*B44C 1/22* (2006.01)
*G01Q 70/12* (2010.01)
(Continued)

(52) U.S. Cl.
CPC ............... *G01Q 70/12* (2013.01); *B82Y 15/00* (2013.01); *B82Y 30/00* (2013.01); *B82Y 35/00* (2013.01); *D01F 9/127* (2013.01)

(58) Field of Classification Search
None
See application file for complete search history.

(56) References Cited

U.S. PATENT DOCUMENTS 4,968,585 A * 11/1990 Albrecht et al. .............. 430/320
5,844,251 A * 12/1998 MacDonald et al. .......... 257/10
(Continued)

FOREIGN PATENT DOCUMENTS

JP    2003 090788 A    3/2003
JP    2004 182537 A    7/2004

OTHER PUBLICATIONS

J. Wan et al, Carbon nanotubes grown by gas source molecular beam epitaxy, 2001, journal of crystal growth, p. 820-824.*
(Continued)

*Primary Examiner* — Binh X Tran
*Assistant Examiner* — David Cathey, Jr.
(74) *Attorney, Agent, or Firm* — LaRiviere, Grubman PC

(57) ABSTRACT

The invention relates to a nanofiber fabrication method comprising nanofiber growth from a catalyst zone, furthermore comprising the following steps:
  producing at least one micropattern (11) on the surface of a substrate (1);
  producing a catalyst zone (50) on the surface of said micropattern;
  nanofiber growth from the catalyst zone,
characterized in that the micropattern (11) comprises a base, at least partially convergent side walls and an upper face, said base being covered with a so-called "poison" layer (4) where no nanofiber growth catalysis effect can take place,
  the so-called "poison" layer not being present on said upper face;
  the base being covered with a catalyst layer (5) on the surface of the so-called "poison" layer;
  the thickness of the "poison" layer and the thickness of the catalyst layer being such that the nanofibers cannot grow either on the side walls or on the base of the micropatterns constructed beforehand.

18 Claims, 7 Drawing Sheets

(51) Int. Cl.
  *B82Y 15/00* (2011.01)
  *B82Y 30/00* (2011.01)
  *B82Y 35/00* (2011.01)
  *D01F 9/127* (2006.01)

(56) References Cited

U.S. PATENT DOCUMENTS 6,350,488 B1* 2/2002 Lee et al. .................. 427/249.1

6,780,664 B1    8/2004 Goruganthu et al.
2003/0143327 A1 7/2003 Schlaf et al.
2004/0036403 A1 2/2004 Ono et al.
2006/0189137 A1* 8/2006 Anderson et al. ............. 438/691
2006/0264323 A1* 11/2006 Dijon et al. .................. 502/325

OTHER PUBLICATIONS

U.S. Appl. No. 12/602,940, filed Jun. 3, 2008, Jean Dijon, et al.

* cited by examiner

METHOD FOR THE COLLECTIVE FABRICATION OF CARBON NANOFIBERS ON THE SURFACE OF MICROPATTERNS CONSTRUCTED ON THE SURFACE OF A SUBSTRATE

PRIORITY CLAIM

This application claims priority to PCT Patent Application Number PCT/EP2008/067145, entitled Method for the Collective Fabrication of Carbon Nanofibers on the Sueface of Micropatterns Constructed on the Sueface of a Substrate and Structure Comprising Nanofibers on the Surface of Micropatterns, filed on Dec. 9, 2008.

The field of the invention is that of nanofibers, and in particular carbon and silicon nanofibers, and it relates more precisely to an original collective integration method for these nanofibers.

The invention aims in particular to add one or more nanofibers (carbon or silicon) to the end of a tip for near-field microscopes (*SPM, Scanning Probe Microscope*) by controlling:
- the localization of the growth by localizing the catalyst on the end of micropatterns,
- the rigidity of the nanofiber so that it can be used in atomic force microscopy, that is to say it does not become deformed during the measurement,
- the dimensions and the cylindrical shape of the nanofiber with a diameter of the order of 20 to 50 nm and a length of between 200 nm and 500 nm,
- the number of carbon nanofibers by adjusting the size of the micropatterns,
- the orientation of the carbon nanofibers by an RF-PECVD growth method,
- the parasitic growths of carbon nanofibers by adding a poison layer.

Nanofibers located on the ends of tips for SPM make it possible in particular to carry out local electrical and/or mechanical measurements. They may also be used in the field of biology for specific recognition after grafting entities onto the tip.

BACKGROUND OF THE INVENTION

According to the prior art, a method for fabricating a nano-support for the growth of nanofibers has already been proposed: Minh et al., J. Vac. Sci. Technol. B 21(4) 1705 (2003) "*Selective growth of carbon nanotubes on Si microfabricated tips and application for electron field emitters*". Such a method makes it possible to produce Si tips with a high aspect ratio by using collective deposition of a catalyst based on iron and "HF-CVD" growth, standing for "Hot Filament Chemical Vapor Deposition", of individual carbon nanotubes on the end of the tip, obtained by virtue of the local characteristics of the electric field. The carbon nanotubes are aligned with the axis of the tip. With this method, however, a problem remains in relation to controlling the length of the nanotube, its orientation and its mechanical strength.

It is also known, according to H. Cui, Patent US20060138077 A1 (2006) "*Method of making an angled tip for a scanning force microscope*", to fabricate an SPM tip, standing for "Scanning Probe Microscopy", which is inclined (mono- or multi-wall carbon nanotube, carbon nanofiber or crystalline nanofiber, etc.) on a lever. A catalyst zone is produced on the end of the lever by various lithography steps. This localization of the catalyst prevents any parasitic growth. The growth is obtained by "DC-PECVD". Perturbation of the field lines at the end of the lever makes it possible to obtain oriented growth of an SPM tip.

It is also known in the U.S. Pat. No. 7,032,437 B2 to carry out ion beam machining of the flat, leading to a non-collective growth method.

The catalyst is etched, but the etching may pose a problem due to deactivation of the catalytic activity.

Angle control is not possible: this is because the "oblique" deposition of the catalyst does not control the wedge shape (triangle, tip) of the catalyst. Furthermore, during the growth steps which are carried out at high temperatures (T>600° C.), reorganization of the catalyst does not allow this shape to be preserved. This method makes it possible to produce conical objects with a diameter of more than 100 nm, which leads to an imposed shape not allowing the field lines to be concentrated strongly, cylindrical shapes being more conducive to fulfilling this function.

SUMMARY OF THE INVENTION

In this context, the invention provides a method for growing a nanofiber, and advantageously a set of nanofibers, making it possible to control the growth of the nanofibers on the ends of prefabricated patterns, referred to below as micropatterns, in a collective fashion while complying with the following conditions:
- localization of the individual growth without etching the catalyst;
- eliminating parasitic growth;
- controlled orientation with respect to the axis of the microfabricated pattern and that of the support of this pattern.

The invention thus relates to a method for nanofiber fabrication on the surface of a substrate, comprising the prior fabrication of a micropattern with a particular geometry. Advantageously, the method of the invention is a collective method for fabricating a set of nanofibers simultaneously.

More precisely, the invention relates to a nanofiber fabrication method comprising nanofiber growth from a catalyst zone, furthermore comprising the following steps:
- producing at least one micropattern on the surface of a substrate;
- producing a catalyst zone on the surface of said micropattern;
- nanofiber growth from the catalyst zone, characterized in that the micropattern comprises a base, at least partially convergent side walls and an upper face, said base being covered with a so-called "poison" layer where no nanofiber growth catalysis effect can take place,
- the so-called "poison" layer not being present on said upper face;
- the base being covered with a catalyst layer on the surface of the so-called "poison" layer;
- the thickness of the "poison" layer and the thickness of the catalyst layer being such that the nanofibers cannot grow either on the side walls or on the base of the micropatterns constructed beforehand.

Advantageously, the base of the micropattern belongs to the surface of the substrate.

According to a variant of the invention, the micropattern production comprises the following steps:
- depositing a layer of so-called hard mask material having a dry etching behavior different from that of the substrate;
- depositing a layer of photoresistive material capable of becoming insoluble under the effect of exposure on the surface of said hard mask;

exposing said photoresistive material through a mask so as to define an insoluble part within the layer of photosensitive material;

dissolving the layer of photoresistive material at the periphery of the insoluble part so as to define an insoluble element;

etching the hard mask at the periphery of the insoluble element so as to define an etch zone;

etching the substrate, leading to the production of at least one micropattern on the surface of the substrate covered with the etch zone on its upper face.

Advantageously, the method may comprise the deposition of a "poison" layer on the base of the micropattern, followed by the deposition of a catalyst layer on all of the substrate of the micropattern covered on its base with said poison layer.

The invention is thus based on the following characteristics:

production of at least one microfabricated pattern having a base, at least partially convergent side walls and an upper face, the base being covered with a "poison" layer;

deposition of a catalyst layer on all of the microfabricated pattern, also referred to as a micropattern;

dewetting of the catalyst layer, making it possible to shape the localized catalyst zone in a controlled way, for example by a heating technique;

carbon nanofiber growth on this assembly by a technique of the PECVD type.

The thickness of the "poison" layer and the thickness of the catalyst layer are such that carbon nanofibers cannot grow either on the side walls or on the base of the micropatterns constructed beforehand.

Typically, the thickness of the catalyst layer is less than roughly a few tens of nanometers, thus making the dewetting operation possible, or about fifty nanometers.

According to one variant, the cross-sectional dimensions of the micropattern are of the order of a few hundreds of nanometers.

According to one variant of the invention, the hard mask layer is made of a nitride of the $Ni_xSi_y$ nitride type.

According to one variant of the invention, the "poison" layer is made of the same material as the catalyst layer, and has a thickness of more than about fifty nanometers.

Advantageously, the "poison" layer is a layer of copper or molybdenum or tungsten.

Advantageously, the catalyst layer is a layer of nickel or iron or cobalt or a palladium-nickel alloy.

BRIEF DESCRIPTION OF THE DRAWINGS

The invention will be understood more clearly, and other advantages will become apparent, on reading the following description which is given nonlimitingly and by virtue of the appended figures, in which.

DETAILED DESCRIPTION OF THE INVENTION

Figure 1A:
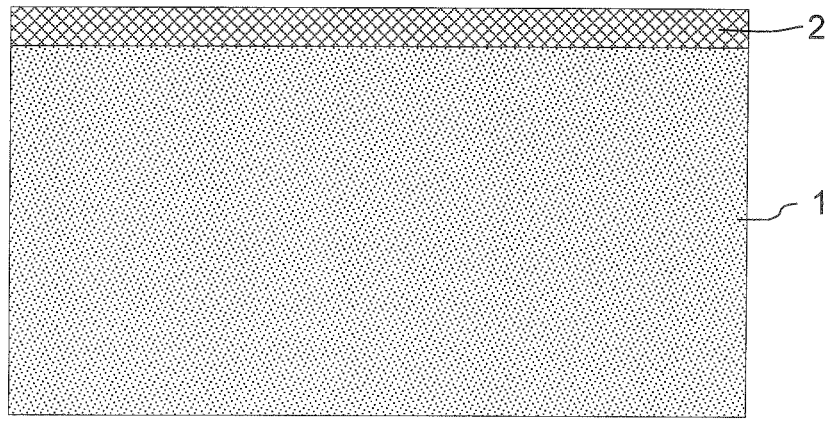
FIGS. 1a to 1h illustrate the various substeps in the formation of micropatterns on the surface of a substrate, in a first example of a nanofiber fabrication method according to the invention.
Figure 1B:
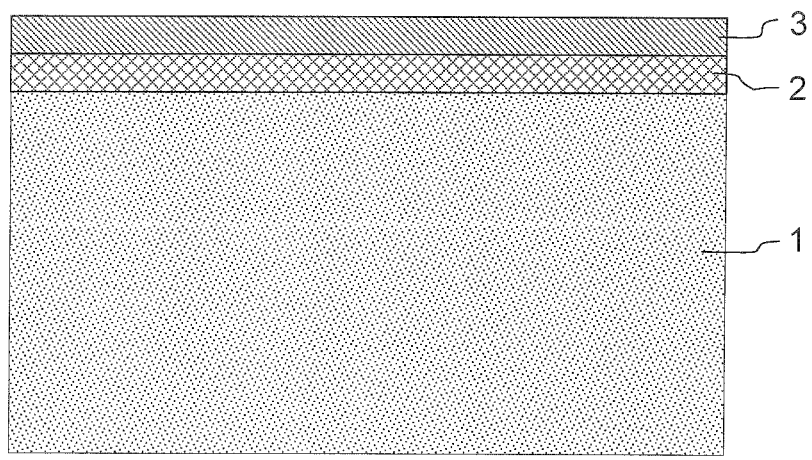
Figure 1C:
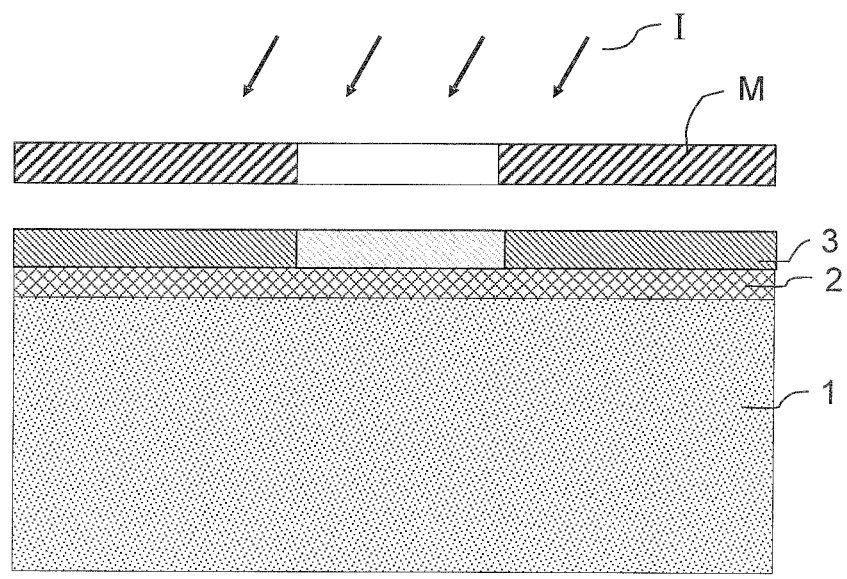
Figure 1D:
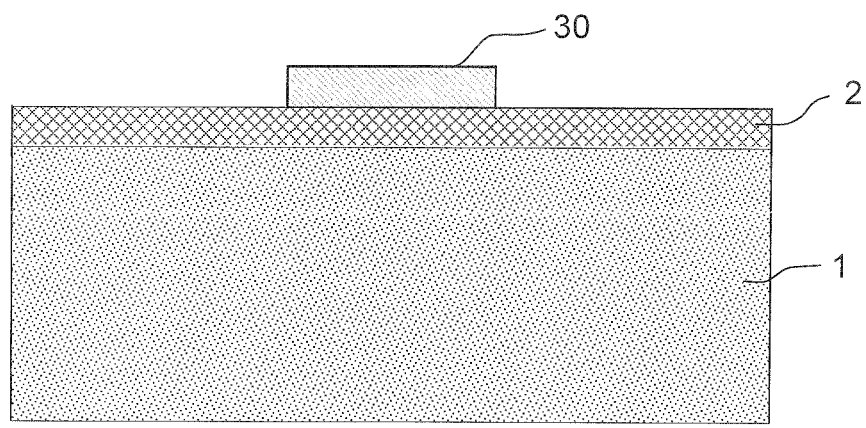
Figure 1E:
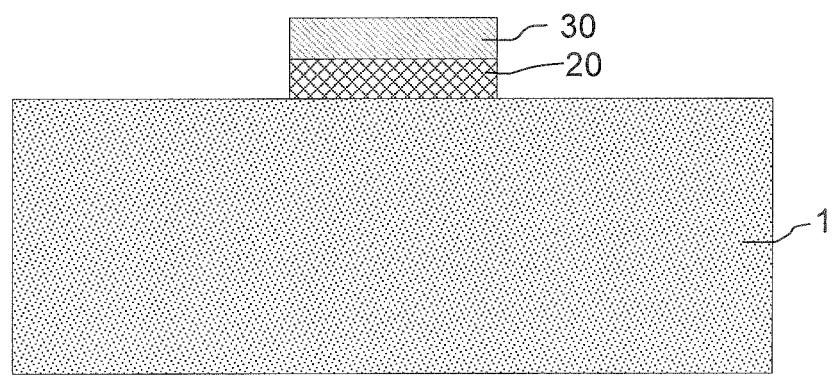
Figure 1F:
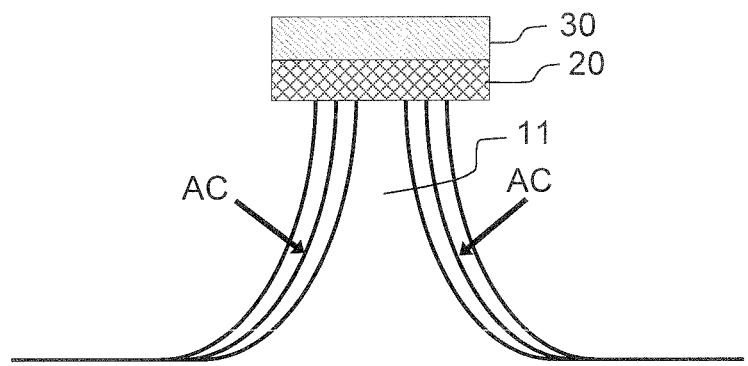
Figure 1G:
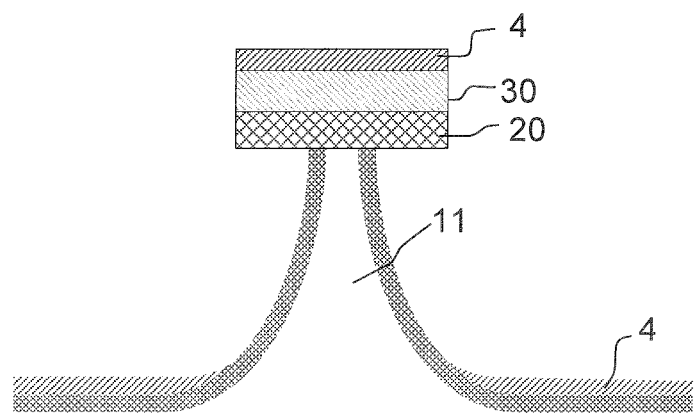
Figure 1H:
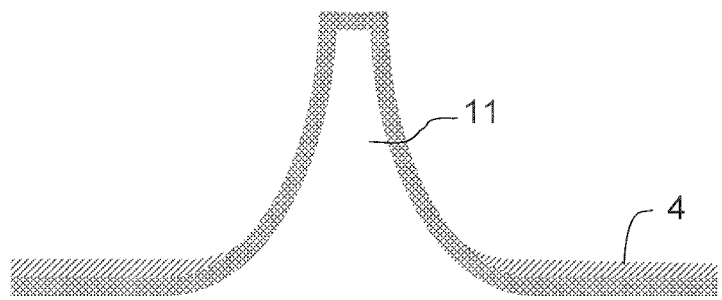

We will now describe in more detail below the various steps of the nanofiber growth method according to the invention, which is illustrated by FIGS. 1a to 1h and relates to the production of a nanofiber but could equally well be generalized to a collective nanofiber production method:

Step A: Micropattern Production:

a hard mask 2 of the silicon dioxide type $SiO_2$ and/or of the nitride type $Si_xN_y$, which has a behavior in terms of etching different from that of the substrate, is deposited on a substrate 1 which may be of the Si type. FIG. 1a illustrates the stack consisting of the substrate 1 covered with the etching mask 2;

a photoresistive layer 3 of the resin type is subsequently deposited, as illustrated in FIG. 1b;

an exposure operation schematized by the reference I, as represented in FIG. 1c, is carried out through a photographic mask M. The purpose of the exposure is to render said photoresistive layer insoluble;

the rest of the photoresistive layer is removed, for example by dissolving it, as illustrated in FIG. 1d, so as to leave only the insoluble exposed element 30;

an anisotropic etching operation is then carried out, making it possible to remove the unprotected layer of material 2, as represented in FIG. 1e, in order to create a pattern 20 supporting the pattern 30;

a second chemical attack, schematized by the reference AC, is subsequently carried out, making it possible to produce the desired pattern referred to as a micropattern 11 corresponding to a flat obtained by etching the substrate, with a controlled size which typically may be of the order of 100 to 500 nm and depends on the duration of the chemical attack, as illustrated in FIG. 1f; the size of the flat is determined so as to obtain only a calibrated droplet of catalyst. This size determines the diameter and the number of fibers obtained on the tip end;

a so-called "poison" layer 4 is then deposited, which may typically be a layer of catalyst, preventing any subsequent wetting (this may for example be a layer of nickel with a thickness of about 100 nm) or alternatively a layer which can negate the effect of a catalyst deposited subsequently in the growth method according to the invention (this may for example be a layer of copper or molybdenum), as represented in FIG. 1g;

the micropattern 11 can then be uncovered by removing the elements 20 and 30 covered with the layer 4, by release of the lift-off type. The micropattern thus constructed has a base covered with a "poison" layer 4, convergent side walls and an upper face, as illustrated in FIG. 1h.

Step B: Depositing a Catalyst Layer

Figure 2:
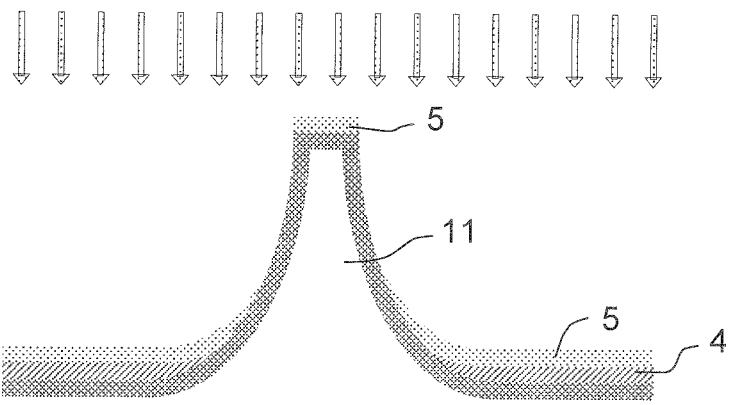
FIG. 2 illustrates the step of depositing a catalyst layer on the surface of the micropatterns which are formed according to the first example of a nanofiber fabrication method according to the invention.

A layer of catalyst is deposited on the micropattern constructed previously. This may be a catalyst of the nickel, iron, cobalt, platinum, molybdenum type, etc., typically having a thickness of from 1 to 20 nm; since the catalyst deposition is homogeneous, the thickness deposited on an inclined surface is less than on a plane surface (reduced by the ratio of the effective cross section to the real surface area). This operation may typically be carried out by cathode "sputtering", or by evaporation (in particular by laser ablation) or alternatively by chemical deposition of the "CVD" type, standing for chemical vapor deposition, "LPCVD" standing for low pressure chemical vapor deposition, "PECVD" standing for plasma enhanced chemical vapor deposition. The catalyst layer 5 is shown in FIG. 2, superimposed on the "poison" layer 4, on the micropattern 11. The vertical arrows schematize the method of the cathode sputtering type.

Step C: Dewetting Operation

The dewetting operation is a key point of the invention. In order to form the catalyst on the surface of the micropattern into a droplet, the temperature of the chamber containing the substrate on which the micropattern has been produced is raised to a temperature of more than 300 degrees, and which may be as much as 800 degrees (varying the size and the kinetics of the droplet formation of the catalyst), the time in which the catalyst droplet can form.

Figure 3:
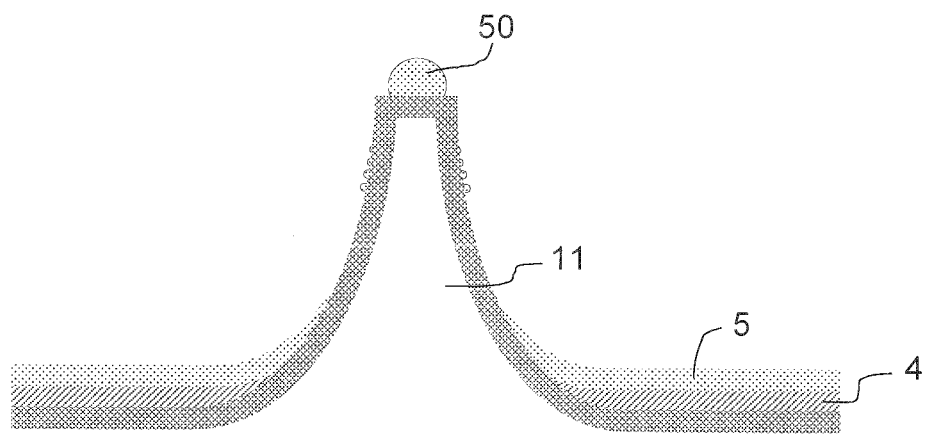
FIG. 3 illustrates the dewetting operation step used in the fabrication method according to the invention, making it possible to localize catalyst zones on the surface of the micropatterns formed beforehand.

The size of the fibers is directly related to that of the droplets, and depends on the thickness and the type of catalyst used, the type and surface condition of said catalyst. The size of the droplet on the walls of a micropattern is much smaller than that on the upper surface of said micropattern, because the thickness deposited there is less, as illustrated in FIG. 3 which shows a catalyst droplet 50 on the surface of a micropattern 11, the surface of which is covered with a "poison" layer 4 and the catalyst layer 5.

Step D: Nanofiber Growth

Figure 4A:
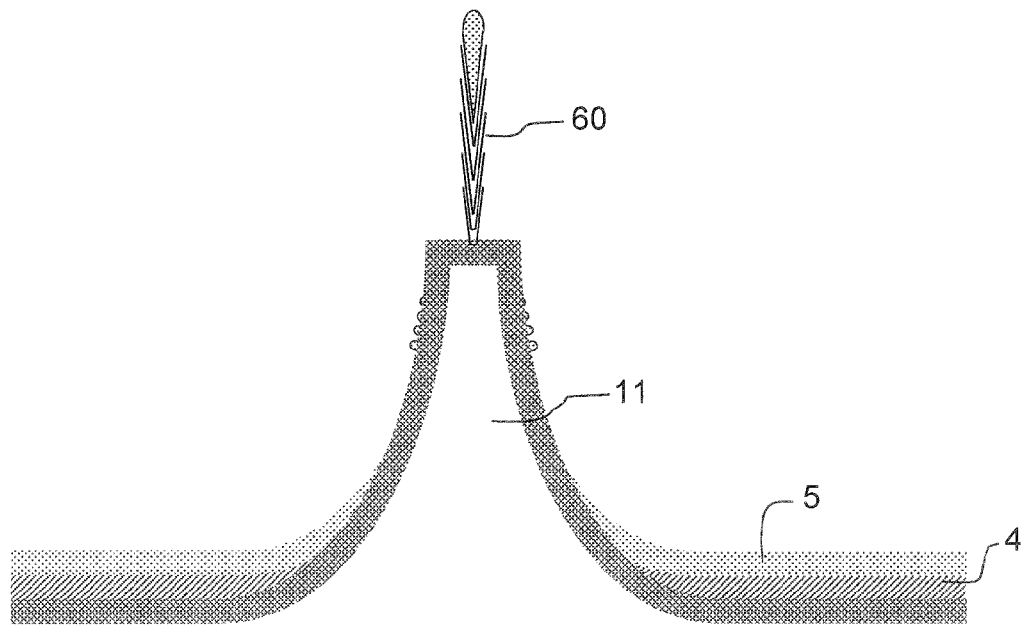
FIGS. 4a and 4b illustrate the step of nanofiber growth on the catalyst zone surface, respectively carried out along two different directions in a fabrication method according to the invention.

According to the method of the invention, nanofiber growth can be carried out on the surface of the catalyst droplet deposited on the micropattern. This growth operation is conventionally carried out by "PECVD", and the orientation of said nanofiber 60 can thus be controlled as illustrated in FIG. 4a.

Figure 4B:
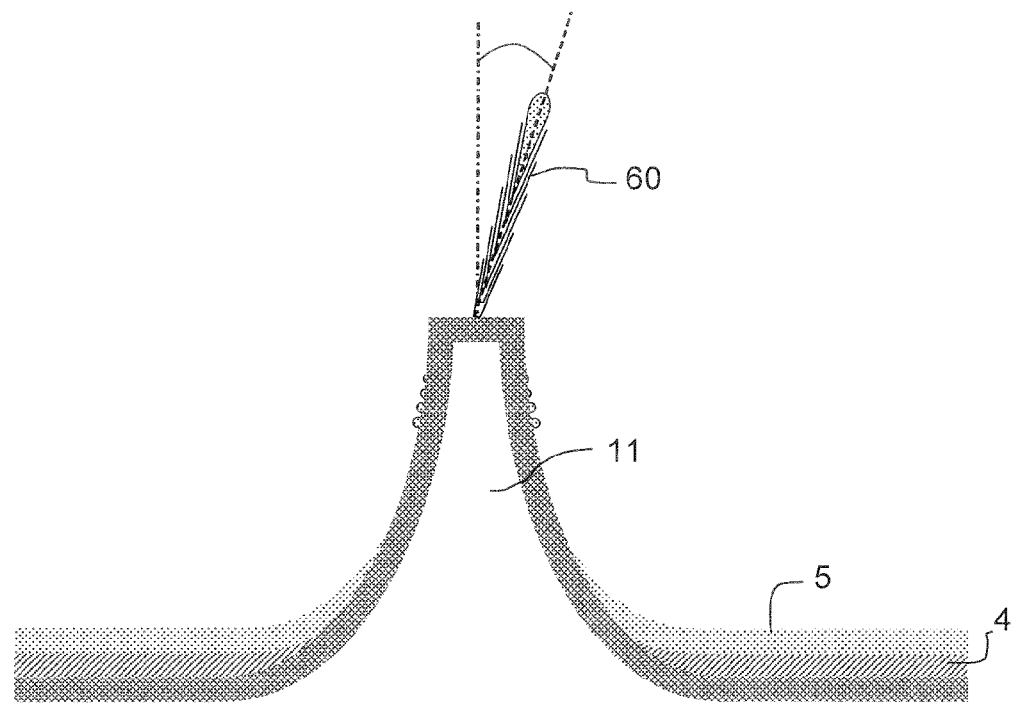

With the method of the invention, oriented growth is made possible irrespective of the orientation of the plane of the micropattern. For certain applications, it may be advantageous to control the inclination and the length of the nanofiber 60 precisely, and thus produce nanofibers such as the one illustrated in FIG. 4b.

We will now describe the nanofiber growth method in more detail below.

Advantageously, this method may be carried out in a deposition chamber having a first electrode, referred to as the cathode, and a second electrode, referred to as the anode, said electrodes being placed opposite one another. An RF generator, connected in series with a capacitor, makes it possible to deliver an RF voltage between the electrodes. One of the electrodes carries in a stack, on its face lying opposite the anode, a graphite target and a sample intended to receive a nanofiber deposit.

A plasma charged with ions is produced in the chamber, the target providing the supply of carbon. On its free face, the sample carries the micropatterns having localized catalyst zones on the surface.

The localized growth of nanofibers on the surface of the catalyst zones may typically be carried out at a temperature of more than 300 degrees.

The plasma is produced from pure hydrogen or a gas mixture based on hydrogen. Typically, the other gases of the mixture may be nitrogen or one or more rare gases selected for example from helium, argon, krypton or xenon.

Figure 5:
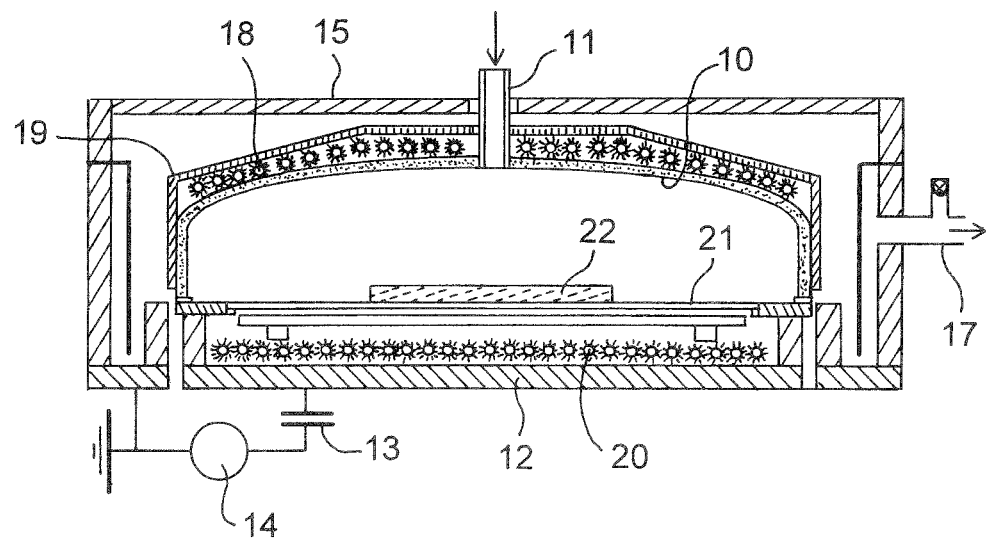
FIG. 5 illustrates a cross-sectional diagram of an example of a deposition chamber for carrying out the nanofiber growth in a method of the invention.

FIG. 5 illustrates a cross-sectional diagram of an example of a deposition chamber allowing this type of growth to be carried out. In a chamber, a bell e.g. of quartz 10 makes it possible to limit the reaction region in which the plasma is produced. This bell 10 makes it possible to introduce gas through a gas inlet 11. The bell rests on a base 12 electrically insulated from a housing 15. An RF generator 14, connected in series with a capacitor 13, makes it possible to deliver an RF voltage between the housing 15, used as an anode, and the base 12 used as a cathode. A gas outlet 17 makes it possible to pump the interior of the housing 15. A first heating device 18 is arranged above the bell 10 and below a thermal reflector 19. A second heating device 20 may also be provided, placed in a low position and making it possible to heat a graphite target 21. The target 21 rests on the base 12 and supports the substrate 22 comprising the micropatterns and the catalyst zones. The target and the substrate are at the same potential.

Figure 6:
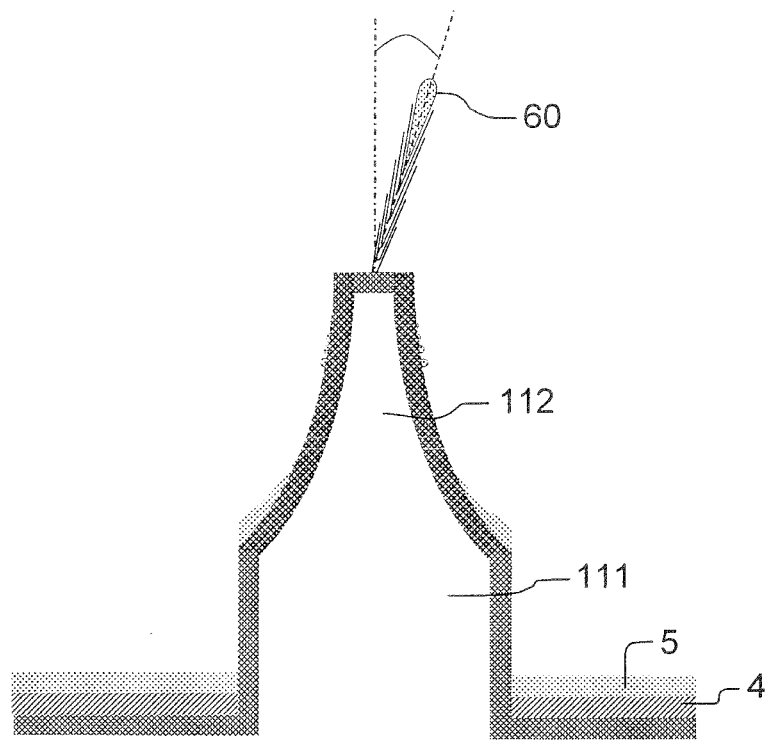
FIG. 6 illustrates a second variant of the method of the invention, comprising the production of an elevated micropattern used for the nanofiber growth in a fabrication method according to the invention.

According to a variant of the invention, it is also possible to produce complex micropatterns, considered as elevated in relation to the substrate. To that end, in this variant, the invention comprises a dry etching step following the chemical attack operation, so as to constitute a micropattern referred to as elevated relative to the substrate. This may in particular be an intermediate etching operation, for example of the R.I.E. type, on the micropatterns produced beforehand as illustrated in FIG. 1f, this being before the release operation of the lift-off type. According to this variant, nanofiber growth can thus be obtained on the surface of the elevated micropattern as illustrated in FIG. 6, which shows a micropattern having a first part 111 with straight side walls and a second part 112 with convergent walls.

What is claimed is:

1. A nanofiber fabrication method for nanofiber growth from a catalyst zone, the method comprising the following steps:
   producing at least one micropattern on the surface of a substrate, said micropattern having a base, partially convergent sidewalls and an upper face;
   producing a catalyst zone on the upper face of the micropattern;
   covering the base with a poison layer for preventing nanofiber growth catalysis;
   preventing the poison layer from covering the upper face;
   covering the poison layer on the base with a catalyst layer;
   dewetting the catalyst zone to form a droplet on the upper face of the micropattern by heating the substrate, wherein the droplet on the upper face is substantially larger than any and all droplets on the sidewalls; and
   growing the nanofiber from the droplet in the presence of a target;
   the thickness of the poison layer and the thickness of the catalyst layer being such that no nanofibers are grown on the sidewalls or on the base.

2. The nanofiber fabrication method as claimed in claim 1, in which the production of the micropattern comprises the following steps:
   depositing a layer of hard mask material having a dry etching behavior different from that of the substrate;
   depositing a layer of photoresistive material capable of becoming insoluble under the effect of exposure on the surface of the hard mask;
   exposing the photoresistive material through a mask so as to define an insoluble part within the layer of photoresistive material;
   dissolving the layer of photoresistive material at the periphery of the insoluble part so as to define an insoluble element;
   etching the hard mask at the periphery of the insoluble element so as to define an etch zone;

etching the substrate, leading to the production of at least one micropattern on the surface of the substrate covered with the etch zone and the insoluble element on its upper face.

3. The nanofiber fabrication method as claimed in claim 2, characterized in that the etching of the hard mask is anisotropic etching.

4. The nanofiber fabrication method as claimed in one of claims 2 and 3, in which the etching of the substrate is a chemical etching operation.

5. The nanofiber fabrication method as claimed in claim 4, in which the micropattern production further comprises a dry etching step following the chemical etching operation so as to constitute a micropattern referred to as elevated relative to the substrate, the micropattern having a first part with straight side walls and a second part with convergent side walls.

6. The nanofiber fabrication method as claimed in claim 5, in which the intermediate dry etching operation is etching of the R.I.E. type.

7. The nanofiber fabrication method as claimed in one of claim 1 or 2, further comprising:
depositing a poison layer on the base of the micropattern;
depositing a catalyst layer on all of the substrate of the micropattern covered on its base with the poison layer.

8. The nanofiber fabrication method as claimed in claim 7, in which the thickness of the catalyst layer is about fifty nanometers.

9. The nanofiber fabrication method as claimed in claim 7, in which the thickness of the catalyst layer is less than about fifty nanometers.

10. The nanofiber fabrication method as claimed in claim 1, in which the poison layer is made of the same material as the catalyst layer, and has a thickness of more than about fifty nanometers.

11. The nanofiber fabrication method as claimed in one of claim 1 or 2, in which the cross-sectional dimensions of the micropattern are of the order of 100 to 1000 nanometers.

12. The nanofiber fabrication method as claimed in claim 1, in which the heating of the substrate is carried out at a temperature of between about 300 degrees and 800 degrees.

13. The nanofiber fabrication method as claimed in one of claim 1 or 2, in which the substrate is made of silicon.

14. The nanofiber fabrication method as claimed in claim 2, in which the hard mask layer is made of silicon dioxide.

15. The nanofiber fabrication method as claimed in claim 2, in which the hard mask layer is made of a nitride of the $Ni_xSi_y$ nitride type.

16. The nanofiber fabrication method as claimed in one of claim 1 or 2, in which the poison layer is a layer of nickel with a thickness of about 100 nanometers.

17. The nanofiber fabrication method as claimed in one of claim 1 or 2, in which the poison layer is a layer of copper or molybdenum or tungsten.

18. The nanofiber fabrication method as claimed in one of claim 1 or 2, in which the catalyst layer is a layer of nickel or iron or cobalt or a palladium-nickel alloy.

* * * * *

UNITED STATES PATENT AND TRADEMARK OFFICE
CERTIFICATE OF CORRECTION

PATENT NO.         : 9,222,959 B2                                  Page 1 of 1
APPLICATION NO.    : 12/747966
DATED              : December 29, 2015
INVENTOR(S)        : Louis Gorintin et al.

It is certified that error appears in the above-identified patent and that said Letters Patent is hereby corrected as shown below:

On the title page, item (73) the Assignee section should be corrected as follows:

Delete "L'Engergie" and replace with --L'Energie--.

In the Specification:

Column 1, line 11, delete "Sueface" and insert --Surface--.

Column 1, line 12, delete "Sueface" and insert --Surface--.

Signed and Sealed this
Twenty-third Day of August, 2016

Michelle K. Lee
*Director of the United States Patent and Trademark Office*